(12) United States Patent
Yeager et al.

(10) Patent No.: US 11,506,125 B2
(45) Date of Patent: Nov. 22, 2022

(54) FLUID MANIFOLD ASSEMBLY FOR GAS TURBINE ENGINE

(71) Applicant: General Electric Company, Schenectady, NY (US)

(72) Inventors: Donald Scott Yeager, Loveland, OH (US); Brandon Wayne Miller, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 638 days.

(21) Appl. No.: 16/051,877

(22) Filed: Aug. 1, 2018

(65) Prior Publication Data
US 2020/0040821 A1  Feb. 6, 2020

(51) Int. Cl.
| | |
|---|---|
| *F02C 7/22* | (2006.01) |
| *F02C 7/24* | (2006.01) |
| *F02C 9/50* | (2006.01) |

(52) U.S. Cl.
CPC ............... *F02C 7/222* (2013.01); *F02C 7/24* (2013.01); *F02C 9/50* (2013.01); *F05D 2260/963* (2013.01); *F05D 2260/964* (2013.01); *F05D 2270/14* (2013.01); *F23R 2900/00013* (2013.01); *F23R 2900/00014* (2013.01)

(58) Field of Classification Search
CPC .... F02C 7/222; F02C 7/22; F02C 7/24; F16L 55/027; F23R 2900/00014; F01N 1/084; F01N 1/06; F01N 1/065; F01N 13/08; F01N 1/082; F01N 1/168; G01K 11/175
See application file for complete search history.

(56) References Cited

U.S. PATENT DOCUMENTS

| | | | |
|---|---|---|---|
| 867,757 A | 10/1907 | Ruecker | |
| 3,501,914 A * | 3/1970 | Asher | ........................ F02C 3/20 60/39.461 |
| 3,793,838 A | 2/1974 | Nash | |

(Continued)

FOREIGN PATENT DOCUMENTS

| | | |
|---|---|---|
| CN | 101876451 A | 11/2010 |
| CN | 105020027 A | 11/2015 |

(Continued)

OTHER PUBLICATIONS

U.S. Appl. No. 15/987,340, filed May 23, 2018.

(Continued)

*Primary Examiner* — William H Rodriguez
(74) *Attorney, Agent, or Firm* — Venable LLP; Peter T. Hrubiec; Michele V. Frank

(57) ABSTRACT

A structure for damping at a fluid manifold assembly for an engine is generally provided. The fluid manifold assembly includes a first walled conduit defining a first fluid passage therewithin. A flow of fluid defining a first frequency is permitted through the first fluid passage. A second walled conduit includes a pair of first portions each coupled to the first walled conduit. A second portion is coupled to the pair of first portions. A second fluid passage is defined through the first portion and the second portion in fluid communication with the first fluid passage. The flow of fluid is permitted through the second fluid passage at a second frequency approximately 180 degrees out of phase from the first frequency.

10 Claims, 6 Drawing Sheets

(56) References Cited

U.S. PATENT DOCUMENTS

| | | | |
|---|---|---|---|
| 4,862,693 A | 9/1989 | Batakis et al. | |
| 5,119,636 A | 6/1992 | Batakis et al. | |
| 5,168,698 A | 12/1992 | Peterson et al. | |
| 5,273,249 A | 12/1993 | Peterson et al. | |
| 5,369,952 A | 12/1994 | Walters | |
| 6,047,677 A * | 4/2000 | Kim | B60G 17/01933 123/184.55 |
| 6,487,860 B2 | 12/2002 | Mayersky et al. | |
| 6,536,457 B2 | 3/2003 | Dooley | |
| 6,560,967 B1 | 5/2003 | Cohen et al. | |
| 6,633,646 B1 * | 10/2003 | Hwang | G10K 11/175 181/227 |
| 6,722,135 B2 | 4/2004 | Davis, Jr. et al. | |
| 7,302,802 B2 | 12/2007 | Alkabie | |
| 7,337,875 B2 | 3/2008 | Proscia et al. | |
| 7,350,357 B2 | 4/2008 | Chen et al. | |
| 7,457,710 B2 | 11/2008 | Schuermans et al. | |
| 7,533,534 B2 | 5/2009 | Alkabie | |
| 7,549,290 B2 | 6/2009 | Holt et al. | |
| 7,603,862 B2 | 10/2009 | Steele | |
| 7,805,943 B2 | 10/2010 | Desaulty et al. | |
| 7,856,830 B2 | 12/2010 | Alkabie | |
| 7,857,094 B2 | 12/2010 | Macquisten et al. | |
| 7,926,278 B2 | 4/2011 | Gerendas et al. | |
| 7,874,159 B2 | 6/2011 | Gerendas et al. | |
| 7,966,801 B2 | 6/2011 | Umeh et al. | |
| 8,024,934 B2 | 9/2011 | Abreu et al. | |
| 8,037,688 B2 | 10/2011 | Hagen et al. | |
| 8,234,873 B2 | 8/2012 | Houtman et al. | |
| 8,322,140 B2 | 12/2012 | Kim et al. | |
| 8,490,379 B2 | 7/2013 | Nomura et al. | |
| 8,701,420 B2 | 4/2014 | Nomura et al. | |
| 8,733,496 B2 | 5/2014 | Ono et al. | |
| 8,931,588 B2 | 1/2015 | Murray | |
| 9,151,502 B2 | 10/2015 | Crothers et al. | |
| 9,255,711 B2 | 2/2016 | Crothers et al. | |
| 9,551,283 B2 | 1/2017 | Crothers et al. | |
| 9,732,960 B2 | 8/2017 | Cutler | |
| 9,784,187 B2 | 10/2017 | Wolfe et al. | |
| 2002/0083987 A1 * | 7/2002 | Dooley | F23K 5/14 137/828 |
| 2002/0153198 A1 * | 10/2002 | Hwang | F01N 1/166 181/228 |
| 2004/0045767 A1 * | 3/2004 | Byrne | G10K 11/175 181/241 |
| 2009/0038684 A1 * | 2/2009 | Chatfield | F04B 11/0091 137/1 |
| 2009/0084450 A1 * | 4/2009 | Shade | F16L 55/04 137/599.01 |
| 2009/0194485 A1 * | 8/2009 | Colotte | B01D 35/143 210/741 |
| 2010/0111713 A1 * | 5/2010 | Chatfield | F04B 39/123 417/53 |
| 2011/0146807 A1 * | 6/2011 | Bassmann | F02C 7/222 137/15.05 |
| 2011/0232288 A1 | 9/2011 | Bizouard et al. | |
| 2012/0167574 A1 | 7/2012 | Uskert | |
| 2012/0240583 A1 | 9/2012 | Penz et al. | |
| 2012/0291896 A1 * | 11/2012 | Shade | F16L 55/02763 137/599.01 |
| 2013/0042627 A1 | 2/2013 | Gerendas et al. | |
| 2013/0283799 A1 | 10/2013 | Carey et al. | |
| 2014/0083111 A1 | 3/2014 | Gregg et al. | |
| 2014/0109591 A1 | 4/2014 | Bothien et al. | |
| 2014/0245746 A1 | 9/2014 | Srinivasan et al. | |
| 2014/0310959 A1 | 10/2014 | Fiebig et al. | |
| 2015/0021117 A1 | 1/2015 | Rupp et al. | |
| 2015/0315968 A1 * | 11/2015 | Roman | F02C 7/22 60/739 |
| 2015/0315969 A1 * | 11/2015 | Fisher | F02C 7/222 60/739 |
| 2015/0322862 A1 * | 11/2015 | Fuller | F02C 7/222 60/739 |
| 2016/0061453 A1 | 3/2016 | Bethke | |
| 2016/0076772 A1 | 3/2016 | Metternich et al. | |
| 2017/0009996 A1 | 1/2017 | Kim et al. | |
| 2017/0051671 A1 * | 2/2017 | Chalaud | F02C 9/36 |
| 2017/0065986 A1 * | 3/2017 | Goulds | F02C 7/222 |
| 2017/0074174 A1 * | 3/2017 | D'Alessandro | F02C 7/264 |
| 2017/0153027 A1 | 6/2017 | Yang | |
| 2017/0175638 A1 * | 6/2017 | Mahadik | F02C 7/222 |
| 2017/0248318 A1 | 8/2017 | Kulkarni | |
| 2017/0342912 A1 | 11/2017 | Kim et al. | |
| 2019/0120141 A1 * | 4/2019 | Ryon | F23R 3/283 |
| 2020/0116086 A1 * | 4/2020 | D'Alessandro | F02C 7/236 |

FOREIGN PATENT DOCUMENTS

| | | |
|---|---|---|
| GB | 2515028 A | 12/2014 |
| WO | WO2011117533 A2 | 9/2011 |
| WO | WO2014/052221 A1 | 4/2014 |

OTHER PUBLICATIONS

U.S. Appl. No. 15/486,872, filed Apr. 13, 2017.
U.S. Appl. No. 15/468,172, filed Mar. 24, 2017.
Bellucci et al., Thermoacoustic Modeling of a Gas Turbine Combustor Equipped With Acoustic Dampers, ASME Turbo Expo 2004: Power for Land, Sea, and Air, vol. 1, Vienna, Austria, Jun. 14-17, 2004, pp. 635-644.
Gaeta et al., Design and Experimental Validation of a Model-Based Injection Pressure Controller in a Common Rail System for GDI Engine, 2011 American Control Conference on O'Farrell Street, San Francisco, CA, Jun. 29-July 1, 2011, pp. 5273-5278.

* cited by examiner

FLUID MANIFOLD ASSEMBLY FOR GAS TURBINE ENGINE

FIELD

The present subject matter relates generally to gas turbine engine fluid manifold assemblies. More particularly, the present subject matter relates to damping structures for gas turbine engine fluid manifold assemblies.

BACKGROUND

Gas turbine engines generally include combustion systems receiving fuel from a fluid manifold assembly coupled to a plurality of fuel nozzles. The fluid manifold assembly may experience high amplitude dynamics (e.g., pressure oscillations, vibrations, harmonics) under various engine operating conditions due to a flow or pressure of the fuel through the fluid manifold assembly, pressure oscillations from the combustion system, and/or dynamics such as vibrations, noise, or harmonics from the engine in general. For example, engine operating conditions may include those defined by a landing/take-off cycle (LTO) for aviation engines or similar ranges for industrial, marine, auxiliary power unit, turboprop or turboshaft configurations. Engine operating conditions may include a generally lower power ignition/start-up and idle operation, a generally higher power take-off and climb condition, and other power conditions in between, such as cruise and approach. As an engine operates across these and other various operating conditions, fuel pressure and flow through the fluid manifold assembly to the combustion system varies, which may result in one or more resonance conditions that may disrupt fuel flow to the combustion system and adversely affect engine operation, up to and including loss of combustion. Unmitigated fluid manifold assembly dynamics may also result in structural damage to the fluid manifold assembly.

Pressure oscillations generally occur in combustion systems of gas turbine engines resulting from the combustion of a fuel and air mixture within a combustion chamber. While nominal pressure oscillations are a byproduct of combustion, increased magnitudes of pressure oscillations may result from generally operating a combustion system at lean conditions, such as to reduce combustion emissions, or a coupling between unsteady heat release and acoustic/pressure fluctuation, the overall acoustics of the combustion system, and transient fluid dynamics within the combustor. High magnitude pressure oscillations may propagate to the fluid manifold assembly. These pressure oscillations may result in intense, single-frequency or multiple-frequency dominated acoustic waves that may propagate within the combustion system and to the fluid manifold assembly, thereby inducing vibrations in the fluid manifold assembly that may result in oscillations in a flow or pressure of fuel within the fluid manifold assembly. Alternatively, oscillation of the fuel flow or pressure may propagate from the fluid manifold assembly to the fuel nozzles and aggravate pressure oscillations inside the combustion system. Low frequency acoustic waves, such as those that occur during engine startup and/or during a low power to idle operating condition, and/or higher frequency waves, which may occur at other operating conditions, may reduce operability margin of the engine, may increase external combustion noise, vibration, or harmonics, or induce loss of flame. Increased pressure oscillations may damage combustion systems or accelerate structural degradation of the combustion system, the fluid manifold assembly, or the engine in general, thereby resulting in engine failure or increased engine maintenance costs.

Therefore, there exists a need for a system for damping fluid manifold assemblies to attenuate dynamics at the engine that may mitigate losses in operability margin, increases in noise, vibration, or harmonics, or structural degradation of the fluid manifold, combustion system, or the engine.

BRIEF DESCRIPTION

Aspects and advantages of the invention will be set forth in part in the following description, or may be obvious from the description, or may be learned through practice of the invention.

A structure for damping at a fluid manifold assembly for an engine is generally provided. The fluid manifold assembly includes a first walled conduit defining a first fluid passage therewithin. A flow of fluid defining a first frequency is permitted through the first fluid passage. A second walled conduit includes a pair of first portions each coupled to the first walled conduit. A second portion is coupled to the pair of first portions. A second fluid passage is defined through the first portion and the second portion in fluid communication with the first fluid passage. The flow of fluid is permitted through the second fluid passage at a second frequency approximately 180 degrees out of phase from the first frequency.

In one embodiment, each of the first portions defines a length providing the second frequency approximately 180 degrees out of phase from the first frequency.

In another embodiment, the first portions comprise an upstream first portion and a downstream first portion each coupled to the first walled conduit. The upstream first portion receives the flow of fluid into the second fluid passage and the downstream first portion provides the flow of fluid from the second fluid passage to the first fluid passage.

In various embodiments, the fluid manifold assembly further includes an actuator coupled to the second walled conduit. The actuator adjusts a length of the second walled conduit to correspond to the second frequency approximately 180 degrees out of phase from the first frequency. In one embodiment, the actuator adjusts the length of the second walled conduit at the first portions. In another embodiment, the actuator is configured in fluid communication with the first passage to receive a control signal defining a fluid parameter of a fluid through the first walled conduit.

In one embodiment, the second walled conduit defines a helical arrangement around the first walled conduit.

In another embodiment, the second walled conduit defines a parametric oscillator.

In yet another embodiment, the fluid is a liquid or gaseous fuel in fluid communication with a fuel nozzle.

In still yet another embodiment, the fluid is an oil or oil-based solution in fluid communication with a lubricant system.

Another aspect of the present disclosure is directed to, a fluid system for a heat engine, the fluid system includes a fluid pump assembly configured to provide fluid to the heat engine; a fluid outlet through which the fluid to the heat engine; and a fluid manifold assembly disposed in fluid communication between the fluid pump assembly and the fluid outlet. The fluid manifold assembly comprises a main conduit through which the flow of fuel defines a first frequency. The fluid manifold assembly comprises a bypass conduit coupled at two or more discrete locations to the main conduit in fluid communication thereto. The flow of fluid through the bypass conduit defines a second frequency approximately 180 degrees out of phase from the first frequency.

In one embodiment, the bypass conduit defines a helical arrangement around the main conduit.

In another embodiment, the fluid system further includes an actuator coupled to the bypass conduit. The actuator adjusts a length of the bypass conduit to adjust the flow of fluid through the bypass conduit to the second frequency approximately 180 degrees out of phase from the first frequency of the flow of fluid through the main conduit.

In yet another embodiment, the fluid system further includes a sensor disposed at one or more of the bypass conduit and the main conduit downstream of the bypass conduit. The sensor is configured to measure a fluid parameter of the fluid. The fluid system further includes a controller configured to execute operations. The operations include adjusting the second frequency of the flow of fluid at the bypass conduit to be 180 degrees out of phase from the first frequency of the flow of fluid at the main conduit.

In various embodiments, the operations further include actuating an actuator coupled to the bypass conduit to adjust a length of the bypass conduit. Adjusting the length of the bypass conduit modulates the second frequency of the fuel at the bypass conduit. In one embodiment, adjusting the length of the bypass conduit includes modulating the length of the bypass conduit at a first portion of the bypass conduit.

In still various embodiments, the operations further include determining a length of the bypass conduit to produce the second frequency of the flow of fluid through the bypass conduit 180 degrees out of phase to the first frequency of the flow of fluid at the main conduit. In one embodiment, the operations further include measuring, via the sensor, the first frequency of the flow of fluid at the main conduit; measuring, via the sensor, the second frequency of the flow of fluid at the bypass conduit; and comparing the first frequency and the second frequency.

In still yet various embodiments, the fluid system further includes a metering unit disposed between the fluid outlet and the fluid pump assembly. The metering unit divides the flow of fluid into two or more independently controllable flow conduits to the fluid outlet. In one embodiment, the fluid manifold assembly is disposed at one or more of the flow conduits.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
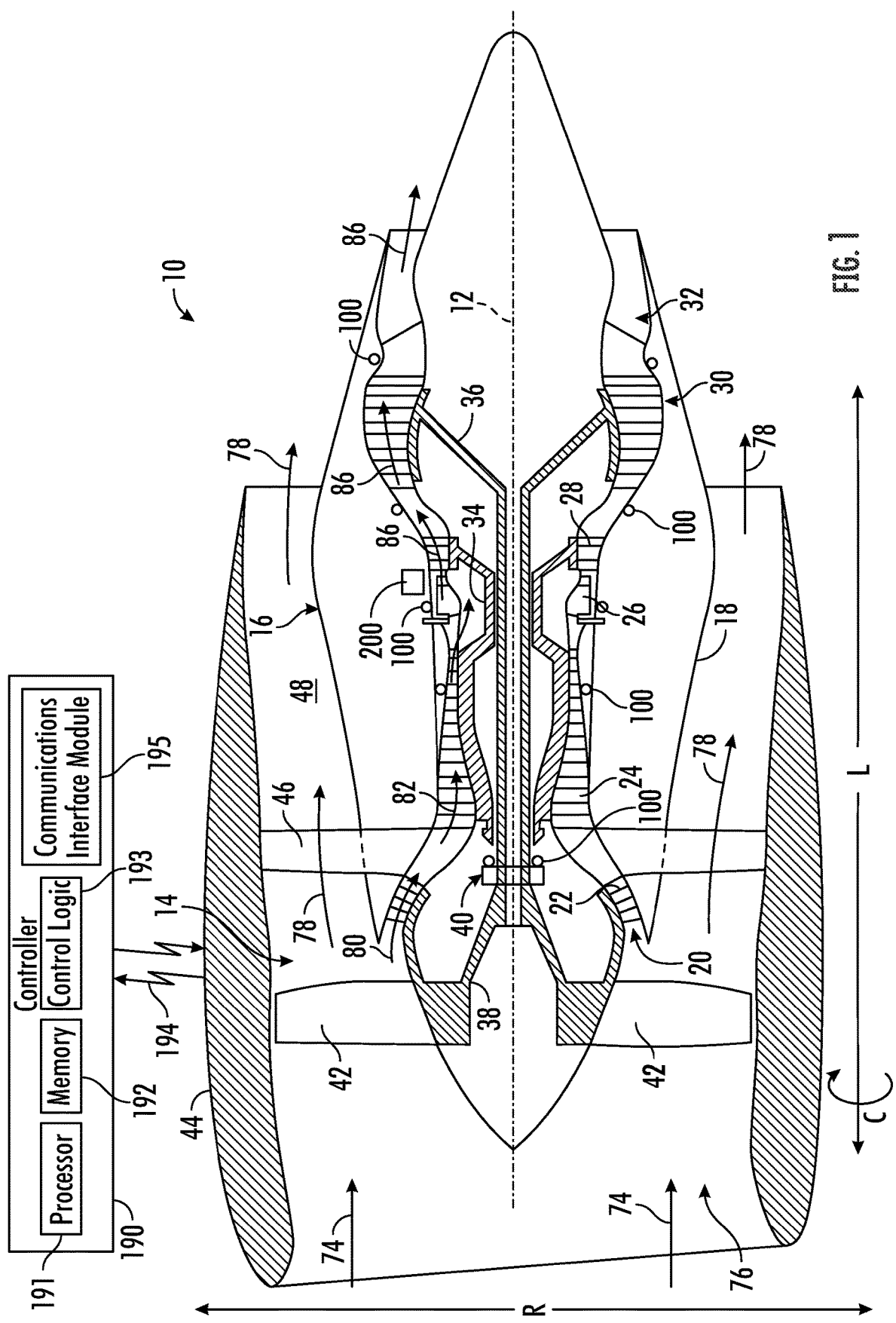
FIG. 1 is a schematic cross sectional view of an exemplary gas turbine engine incorporating an exemplary embodiment of a fluid manifold assembly and damper.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "upstream of" or "downstream of" generally refer to directions toward "upstream 99" or toward "downstream 98", respectively, as provided in the figures.

Embodiments of a fluid manifold assembly are generally provided that may attenuate fluid manifold assembly dynamics across one or more operating conditions of a system to which the fluid manifold assembly is attached. The various embodiments of the fluid manifold assembly generally provided herein may attenuate dynamics (e.g., vibrations, noise, harmonics, knocking, water hammer, etc.) as fluid parameters, such as fluid flow, pressure, or temperature, change across various operating conditions of the system. Systems to which embodiments of the fluid manifold assembly may be disposed include, but are not limited to, engines, including turbo machines and reciprocating engines, fluid pump systems, including liquid or gaseous fuel pumps, air pumps, or gas pumps generally, or industrial systems.

Referring now to the drawings, FIG. 1 is a schematic partially cross-sectioned side view of an exemplary turbine engine 10 herein referred to as "engine 10" as may incorporate various embodiments of the present disclosure. Although further described below with reference to a gas turbine engine, the present disclosure is also applicable to industrial applications, engines, or turbomachinery in general, or specifically to pressurized flows of fluid through a system. For example, the present disclosure may be directed to fluid systems generally, liquid or gaseous fuel pump systems, or air or gas pump systems. Although further described in reference to a turbo machine, various embodiments of a fluid manifold assembly 100 described herein may be applied to steam or gas turbine engines, including turbojet, turboprop, turbofan, and turboshaft gas turbine engine configurations, including marine and industrial turbine engines and auxiliary power units. Still other exemplary engines into which the fluid manifold assembly 100 may be disposed include internal combustion engines generally, such as those for automotive, aeronautical, aerospace, or power generation.

As shown in FIG. 1, the exemplary engine 10 has a longitudinal or axial centerline axis 12 that extends there through for reference purposes and generally along a longitudinal direction L. The engine 10 further defines a radial direction R extended from the axial centerline 12, and a circumferential direction C around the axial centerline 12. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

During operation of the engine 10, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. The now compressed air as indicated schematically by arrows 82 flows through the combustion section 26.

The engine 10 includes a fluid manifold assembly 100 generally providing a pressurize flow of fluid throughout the engine 10. Various embodiments of the fluid manifold assembly 100 provided at a turbo machine may be disposed at the fan section 14, the compressor section (e.g., the LP compressor 22, the HP compressor 24, or both), the combustion section 26, the turbine section (e.g., the HP turbine 28, the LP turbine 30, or both), the exhaust section 32, or bearing assemblies, heat exchangers, dampers, cooling systems, at or within the engine. In various embodiments of the fluid manifold assembly 100, the type of fluid provided may generally be liquid or gaseous. For example, the fluid may include liquid or gaseous fuel, oil or oil-based solutions (e.g., lubricant, hydraulic fluid, etc.), water or water-based solutions, coolants or supercritical fluids, air, gases or inert gases, or combinations thereof. However, it should be appreciated that still various embodiments of the fluid manifold assembly 100 may be disposed in pressurized fluid systems generally, such as, but not limited to, engines for automotive, marine, aviation, or power generation, or industrial systems for generally flowing or pumping fluid.

In one embodiment, the fluid manifold assembly 100 surrounds the combustion section 26 to deliver a pressurized liquid or gaseous fuel to the combustion section 26. The fluid manifold assembly 100 is coupled to a plurality of fuel nozzles disposed through the combustion section 26 to deliver fuel into the engine 10 and mix with the compressed air 82 and ignite within the combustion section 26 to produce combustion gases as indicated schematically by arrows 86. The fluid manifold assembly 100 at the combustion section 26 may be part of a fluid system 200, such as shown and described in regard to FIG. 7.

Referring still to FIG. 1, the engine 10 may further include a controller 190. In general, the controller 190 can correspond to any suitable processor-based device, including one or more computing devices. For instance, FIG. 1 illustrates one embodiment of suitable components that can be included within the controller 190. As shown in FIG. 1, the controller 190 can include a processor 191 and associated memory 192 configured to perform a variety of computer-implemented functions. In various embodiments, the controller 190 may be configured to actively adjust or modulate a frequency of a flow of fluid through the fluid manifold assembly 100 such as further shown and described in regard to FIGS. 2-7.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 192 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 190 may define one or more of a full authority digital engine controller (FADEC), a propeller control unit (PCU), an engine control unit (ECU), an electronic engine control (EEC), a fuel control unit, a lubricant control unit, or another fluid control device.

As shown, the controller 190 may include control logic 193 stored in memory 192. The control logic 193 may include instructions that when executed by the one or more processors 191 cause the one or more processors 191 to perform operations such as described in regard to FIGS. 2-7.

Additionally, as shown in FIG. 1, the controller 190 may also include a communications interface module 195. In various embodiments, the communications interface module 195 can include associated electronic circuitry that is used to send and receive data. As such, the communications interface module 195 of the controller 190 can be used to receive data from the fluid manifold assembly 100 or fluid system 200 providing the fluid parameter, such as a vibrations measurement (e.g., an accelerometer, a proximity probe, a displacement probe, etc.), pressure, or temperature. The communications interface module 195 may additionally, or alternatively, receive data from the fan section 14, the compressor section (e.g., the LP compressor 22, the HP compressor 24, or both), the combustion section 26, the turbine section (e.g., the HP turbine 28, the LP turbine 30, or both), or the exhaust section 32, such as a vibrations measurement, a pressure measurement, a temperature measurement, stress or strain (e.g., a strain gage), thrust output (e.g., calculated via engine pressure ratio or rotor speed), or applied load (e.g., a load cell), pressure (e.g., a pressure transducer), or rotational speed (e.g., a 1/rev signal, a tachometer, or other speed detection device proximate to the rotor assembly). In addition, the communications interface module 195 can also be used to communicate with any other suitable components of the engine 10, including any number of actuators (e.g., actuator 130 shown and described in regard to FIGS. 2-7) configured to modulate or adjust the frequency of fluid at the fluid manifold assembly 100 or fluid system 200.

It should be appreciated that the communications interface module 195 can be any combination of suitable wired and/or wireless communications interfaces and, thus, can be communicatively coupled to one or more components of the engine 10, such as the fluid manifold assembly 100 or the fluid system 200, via a wired and/or wireless connection.

Referring still to FIG. 1, the combustion gases 86 generated in the combustion section 26 flow into the HP turbine 28, thus causing the HP rotor shaft 34 to rotate, thereby supporting operation of the HP compressor 24. The combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 2:
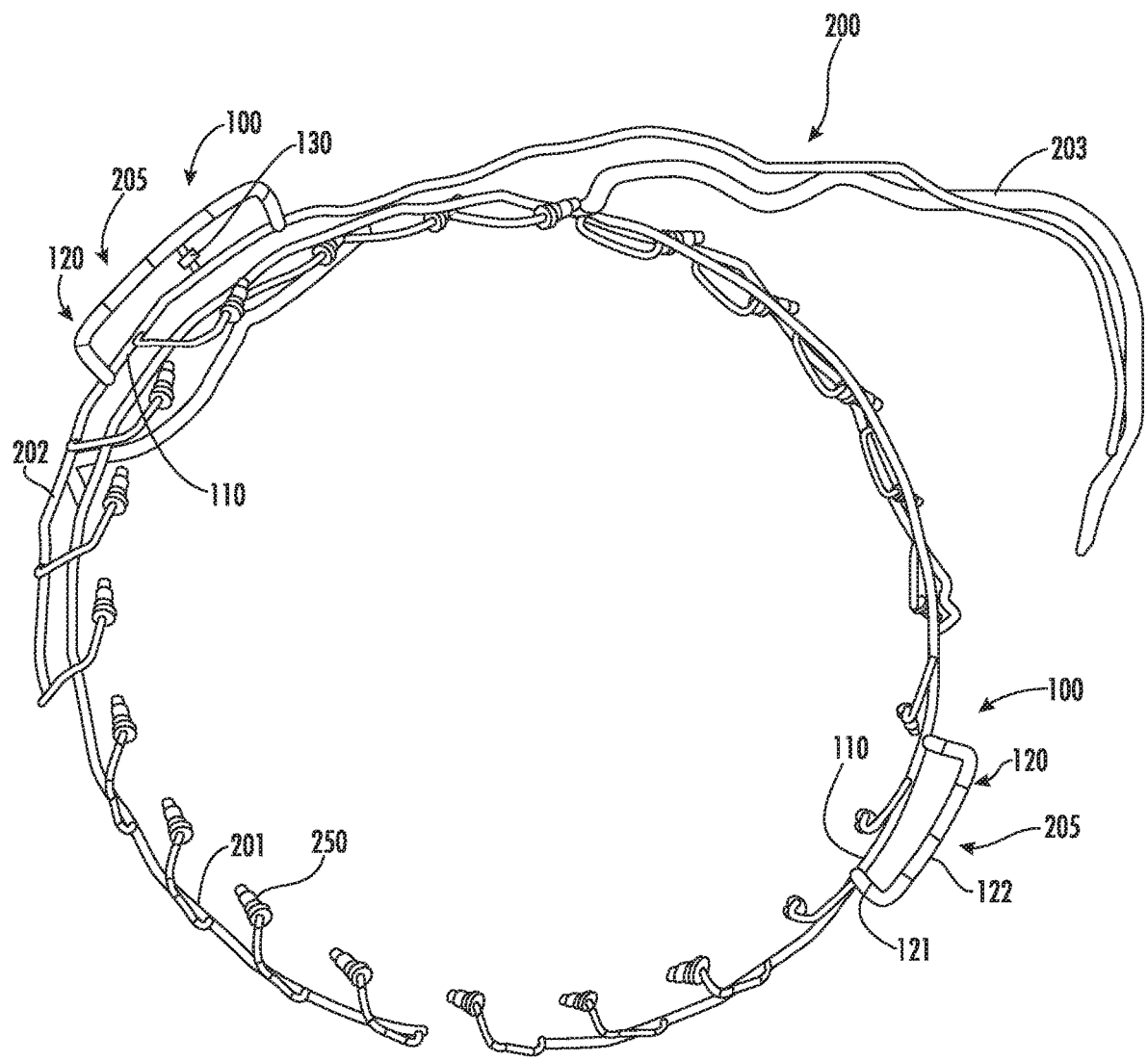
FIG. 2 is an exemplary embodiment of the fluid manifold assembly of the engine shown in FIG. 1.

Referring now to FIG. 2, an exemplary embodiment of the fluid manifold assembly 100 for the engine 10 is generally provided. Various embodiments of the fluid manifold assembly 100, such as generally provided in regard to FIG. 2, may define a fuel manifold for the combustion section 26, the turbine section 31, or the exhaust section 32. However, still various embodiments of the fluid manifold assembly 100 may define a conduit through which a flow of oil or oil-based solutions, hydraulic fluids, air or gaseous fluids, or liquid or gaseous fluids such as fuels, water or steam, coolants, or combinations thereof, may be provided to through the engine 10 or another exemplary system.

Figure 3:
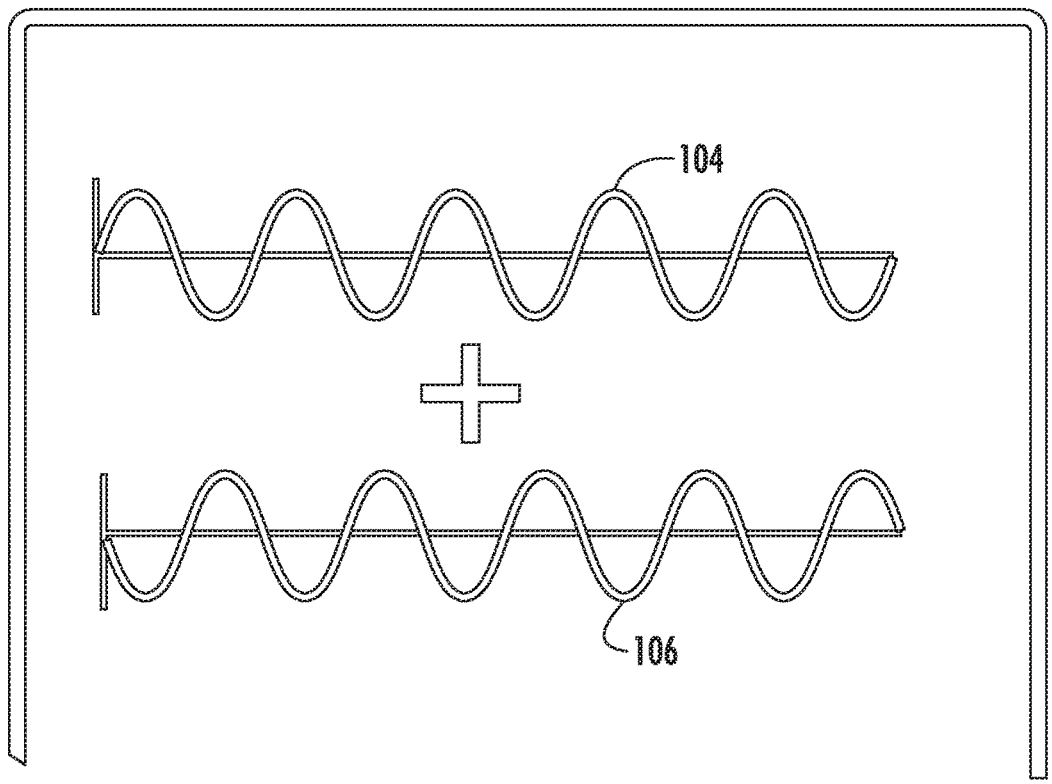
FIG. 3 is an exemplary diagram depicting a first frequency and a second frequency at the fluid manifold assembly of FIG. 2.

Referring also to FIG. 3, an exemplary diagram depicting a first frequency 104 and a second frequency 106 is generally provided. Referring to FIGS. 2-3, the fluid manifold assembly 100 includes a first walled conduit 110 defining a first fluid passage 115 therewithin. A flow of fluid 105 is provided to the fluid manifold assembly 100, such as via a pump, compressor, or other apparatus configured to supply fluid, such as further described in regard to FIG. 7. The flow of fluid 105 entering the first fluid passage 115 defines a first frequency 104 (FIG. 3). The fluid manifold assembly 100 further includes a second walled conduit 120 coupled to the first walled conduit 110. The second walled conduit 120 defines a second fluid passage 125 therewithin through which a portion of the flow of fluid 105 is permitted, shown via arrows 105(b). The first walled conduit 110 and the second walled conduit 120 are coupled together in fluid communication to permit the flow of fluid 105 through both the first fluid passage 115 and a portion thereof (fluid 105(b)) through the second fluid passage 125. The flow of fluid 105(b) through the second fluid passage 125 defines a second frequency 106 (FIG. 3).

Referring still to FIGS. 2-3, the flow of fluid 105(b) defines the second frequency 106 approximately 180 degrees out of phase from the flow of fluid 105 defining the first frequency 104. More specifically, the second walled conduit 120 is sized such as to permit the portion of the flow of fluid 105 from the first fluid passage 115 into the second fluid passage 125 such as to define the flow of fluid 105(b) as defining the second frequency 106 at the second fluid passage 125. As the flow of fluid 105(b) is permitted back into the first fluid passage 115 from the second fluid passage 125, the flow of fluid 105(b) defining the second frequency 106 generates destructive interference of the first frequency 104 such as to cancel out the first frequency 104 of the flow of fluid 105, such as depicted at flow of fluid 105(a) along a distance 123 of the first walled conduit 110. In one embodiment, such as generally depicted, the flow of fluid 105(b) defining the second frequency 106 generates destructive interference of the first frequency 104 such as to cancel out the first frequency 104 of the flow of fluid 105(a) downstream of the re-entry of the flow of fluid 105(b) into the first fluid passage 115, such as depicted at arrows 105(c). However, in other embodiments, the flow of fluid 105(b) may be re-introduced to the first fluid passage 115 upstream along the first walled conduit 110. As such, vibrations, acoustics, harmonics, oscillations, or other undesirable dynamics may be mitigated or eliminated at the fluid manifold assembly 100.

Figure 4:
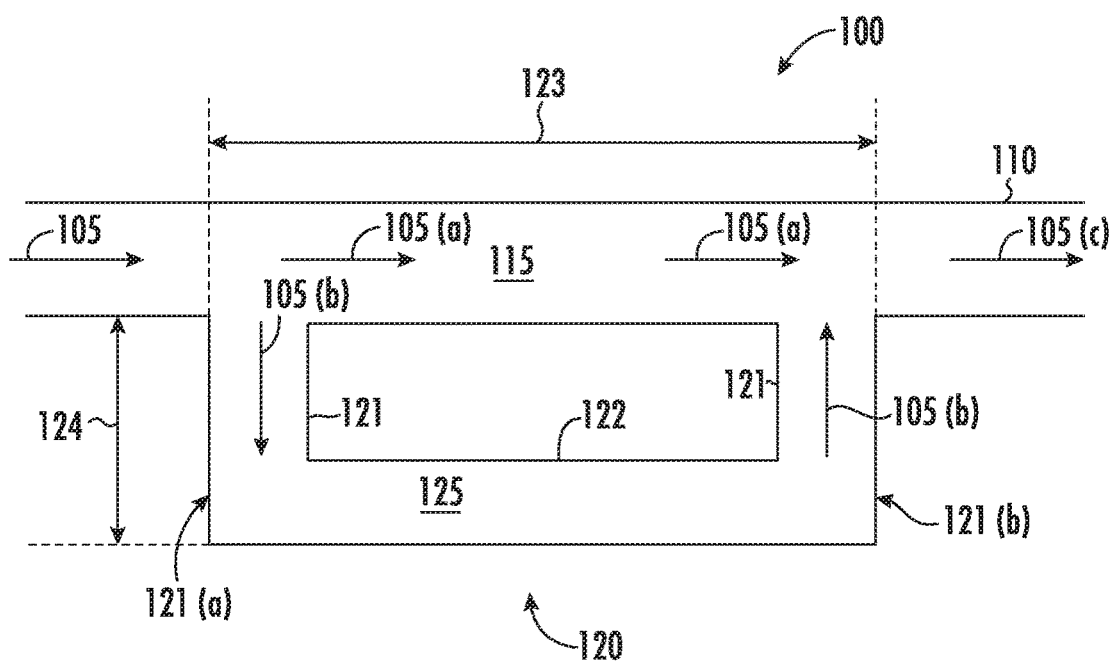
FIG. 4 is an exemplary schematic embodiment of the fluid manifold assembly of FIG. 2.
Figure 5A:
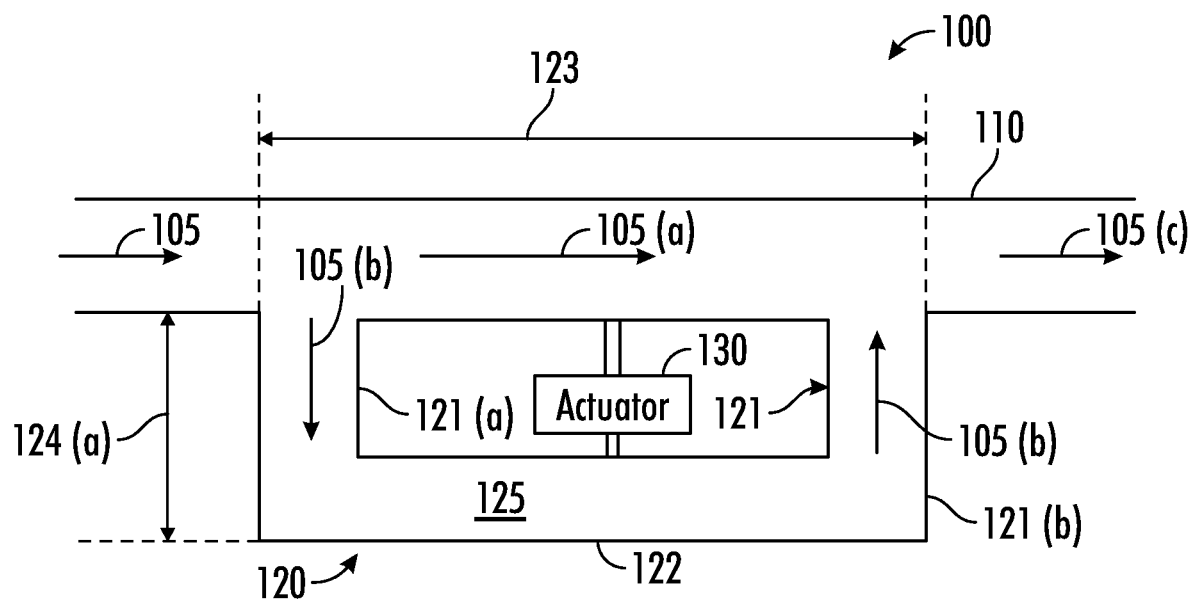
FIG. 5A is an exemplary schematic embodiment of the fluid manifold assembly of FIG. 2 depicting the second walled conduit at a first length.
Figure 5B:
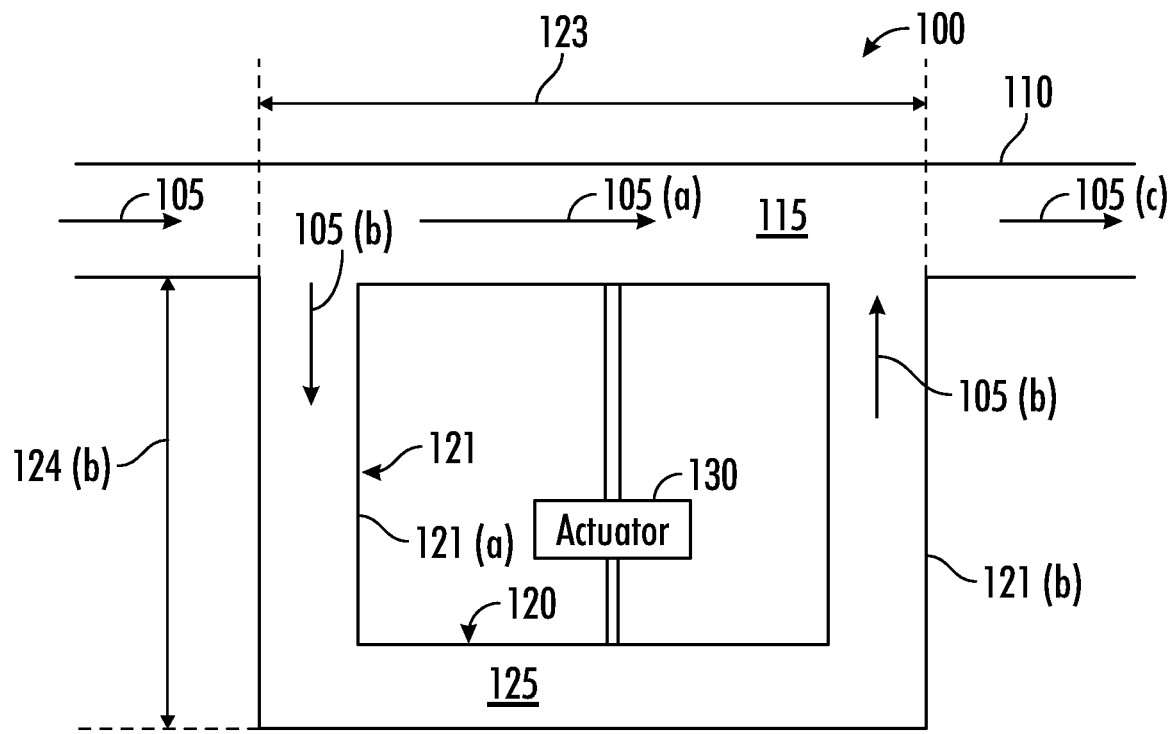
FIG. 5B is an exemplary schematic embodiment of the fluid manifold assembly of FIG. 2 depicting the second walled conduit at a second length.
Figure 5C:
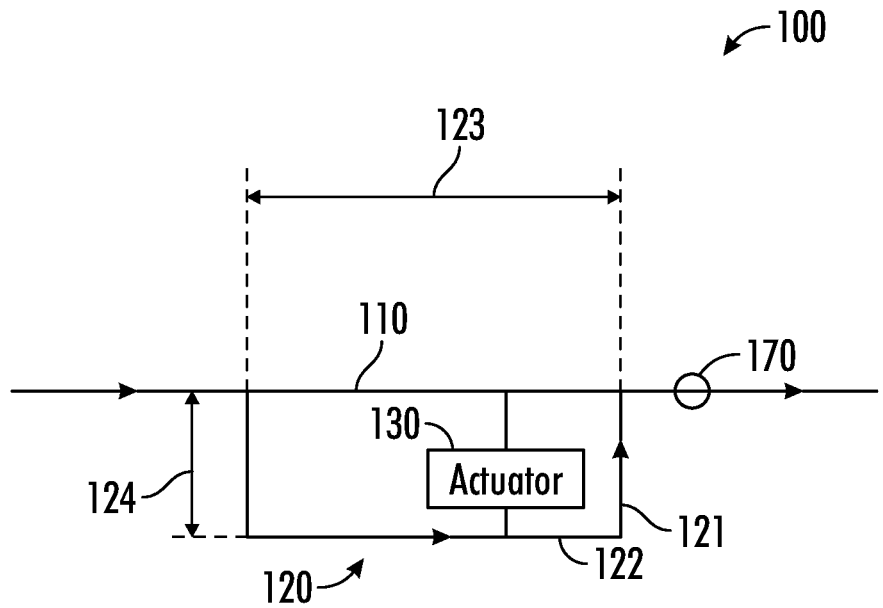
FIG. 5C is another exemplary schematic embodiment of the fluid manifold assembly of FIG. 2.
Figure 5D:
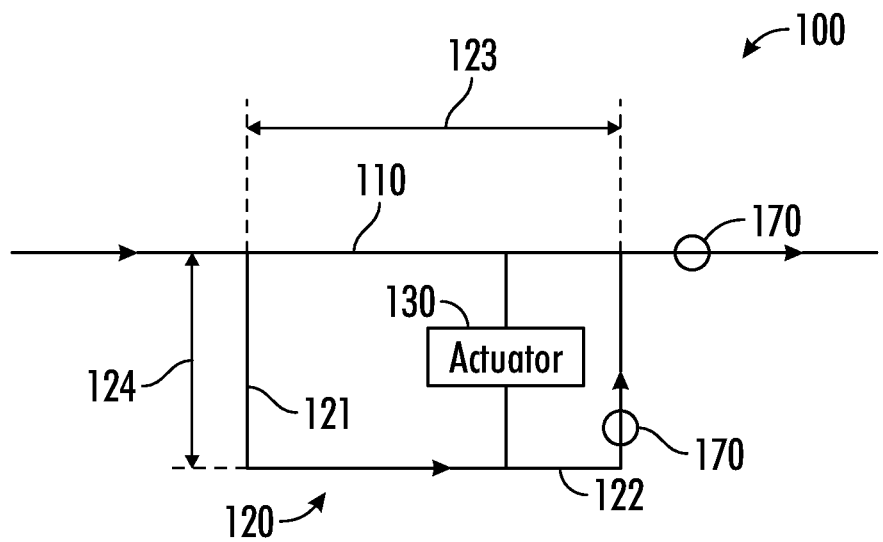
FIG. 5D is yet another exemplary schematic embodiment of the fluid manifold assembly of FIG. 2.
Figure 6:
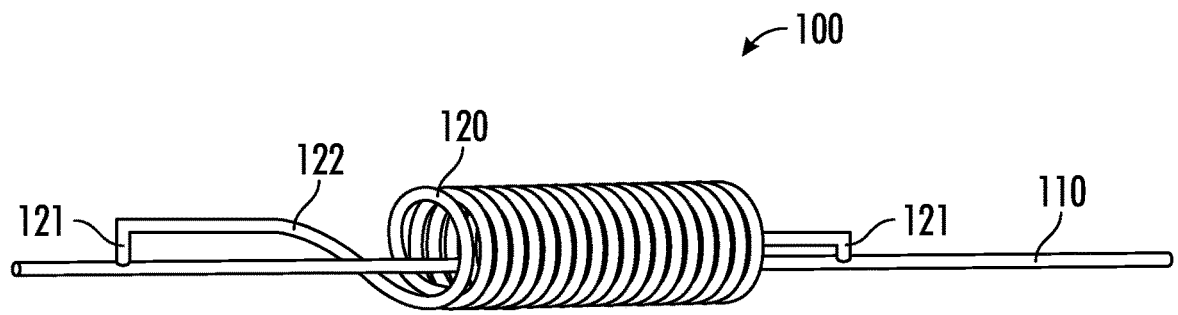
FIG. 6 is a perspective view of an exemplary schematic embodiment of the fluid manifold assembly of FIG. 2.

Referring now to FIGS. 4-6, further exemplary schematic embodiments of the fluid manifold assembly 100 of FIG. 2 are generally provided. The second walled conduit 120 further includes a pair or more of first portions 121 each coupled to the first walled conduit 110. A second portion 122 is coupled to the pair of first portions 121. The first portions 121 and the second portions 122 together define the second fluid passage 125 therewithin in fluid communication with first fluid passage 115 at the first walled conduit 110. More specifically, the pair of first portions 121 includes an upstream first portion 121(a) and a downstream first portion 121(b) each coupled to the first walled conduit 110 and each coupled together via the second portion 122.

It should be appreciated that in other embodiments, the downstream first portion 121(b) may be disposed upstream relative to the first walled conduit 110 and the first fluid passage 115, such that "downstream" may be relative to the flow of fluid 105(b) within the second fluid passage 125. As such, various embodiments of the fluid manifold assembly 100 may define a feedback or feed-forward arrangement of the second walled conduit 120 relative to the first walled conduit 110.

The distance 123 along the first walled conduit 110, or more particularly, the first fluid passage 115 defined within the first walled conduit 110, is defined between the upstream first portion 121(a) and the downstream first portion 121(b) of the second walled conduit 120. Each of the first portions 121 defines a length 124 sized to provide the second frequency 106 approximately 180 degrees out of phase from the first frequency 104.

In various embodiments, such as generally depicted in regard to FIGS. 5A-5C, the fluid manifold assembly 100 further includes an actuator 130 coupled to the second walled conduit 120. The actuator 130 is configured to adjust the length 124 of the second walled conduit 120. The actuator 130 may be any type suitable for adjusting or modulating the length 124 of the second walled conduit 120. For example, the actuator 130 may be coupled to the first walled conduit 110 and the second walled conduit 120. The actuator 130 may be configured to receive a control signal such as to adjust or modulate the length 124 of the second walled conduit 120 based on a fluid parameter of the flow of fluid 105. For example, the fluid parameter may be one or more of a pressure, temperature, flow rate, density, viscosity, or fluid type of the fluid 105. Changes in the fluid parameter may be based on changes in operation condition of the engine 10. For example, changes in operating condition of the engine 10 may include, but is not limited to, changes in power or load output (e.g., startup, idle or minimum steady-state condition, full load or maximum steady-state condition, one or more intermediate steady state conditions therebetween, or transient conditions therebetween.

The actuator 130 may be more specifically configured to adjust the length 124 of the second walled conduit 120 such as to produce the second frequency 106 at the flow of fluid 105(b). For example, FIG. 5A depicts a first length 124(a) of the second walled conduit 120 based on a first fluid parameter of the fluid 105 and FIG. 5B depicts a second length 124(b) of the second walled conduit 120 based on a second fluid parameter of the fluid 105 different from the first fluid parameter of the fluid 105. As another example, the first frequency 104 of the flow of fluid 105(a) may change or alter based at least on changes in the fluid parameter. As the first frequency 104 changes based on the fluid parameter, the actuator 130 adjusts the length 124 at the second walled conduit 120 to produce the second frequency 106 at the flow of fluid 105(b) approximately 180 degrees out of phase from the first frequency 104. As the flow of fluid 105(b) is re-introduced to the first fluid passage 115, the first frequency 104 and the fuel frequency of the flow of fluid 105 generally is cancelled out over the distance 123 of the first fluid passage 115.

In one embodiment, the actuator 130 may receive from the first fluid passage 115 the control signal defining the fluid parameter of the fluid 105. For example, the actuator 130 may be configured in fluid communication with the first fluid passage 115. The fluid parameter at the first fluid passage 115 (e.g., pressure, temperature, etc.) may, at least in part, provide an input by which the actuator 130 alters or modulates the length 124 of the second walled conduit 120.

In another embodiment, such as shown in regard to FIG. 5C, the fluid manifold assembly 100 may further include a sensor 170 disposed at the first fluid passage 115, the second fluid passage 125, or both. The sensor 170 is configured to receive the fluid parameter from the flow of fluid 105. Various embodiments of the sensor 170 may define a pressure sensor (e.g., a pressure sensor acquiring a static pressure and/or a dynamic pressure measurement), a thermocouple, a vibratory or acoustic measurement (e.g., an accelerometer), a flow meter, or combinations thereof. The sensor 170 may further be configured to transmit the control signal based at least on the fluid parameter. For example, the sensor 170 may transmit to the actuator 130 the control signal based at least on the fluid parameter of the fluid 105 at the first fluid passage 115. As another example, the sensor 170 may transmit to the controller 190 the fluid parameter, in which the controller 190 provides the control signal to the actuator 130 by which an adjustment or modulation of the length 124 of the second walled conduit 120 is performed.

In still another embodiment configured substantially similarly such as shown in regard to FIG. 5C, the exemplary embodiment of the fluid manifold assembly 100 shown in FIG. 5D may further include the sensor 170 disposed at the second fluid passage 125 such as to receive the fluid parameter from the flow of fluid 105 such as described in regard to FIG. 5C. The sensors 170 disposed at the first walled conduit 110 at the first fluid passage 115 and the second walled conduit 120 at the second fluid passage 125 may acquire the fluid parameter at each passage 115, 125 and compare the acquired fluid parameters to determine the amount by which the actuator 130 extends or contracts the length 124 of the second walled conduit 120. For example, the controller 190 (FIG. 1) may determine the amount by which the actuator 130 modulates based on a difference between the acquired first frequency 104 and the second frequency 106. Determining the amount by which the actuator 130 modulates or adjusts the length 124 of the second walled conduit 120 may further include comparing the first frequency 104 and the second frequency 106 to a predetermined schedule, a transfer function, a graph, a chart or lookup table, or a function.

In still various embodiments, the actuator 130 may receive the control signal based on changes in operating condition of the engine 10. In one embodiment, the control signal may alter or modulate the length 124 based, at least in part, on a predetermined schedule based generally on the operating condition of the engine 10, or more specifically on the fluid parameter, to produce the second frequency 106 at the flow of fluid 105(b). In another embodiment, the control signal may receive a fluid parameter measurement or calculation, such as from the sensor 170. The engine 10 generally or the fluid manifold assembly 100 more specifically may calculate the length 124 necessary to produce the second frequency 106 at the flow of fluid 105(b).

Various embodiments of the actuator 130 shown and described herein may more specifically adjust or modulate the length 124 of the first portions 121 of the second walled conduit 120. For example, the first portions 121 may define a piston structure enabling a change in the length 124 of the second walled conduit 120. As another example, the first portions 121 may define a crimped sheath configured to enable expansion and contraction of the length 124 of the second walled conduit 120 via the first portions 121. As yet another example, the first portions 121 may generally define an elastic material enabling expansion and contraction of the length 124 of the second walled conduit 120.

One embodiment of the actuator 130 may define a hydraulic or pneumatic actuator, such as to receive the control signal via the fluid 105, or another fluid, or another signal source. Another embodiment of the actuator 130 may define a solenoid actuator, such as to receive the control signal via an electrical source. The control signal via the electrical source may include, but is not limited to, an electrical source for the controller 190, a piezoelectric energy source, or another suitable electrical source. Still another embodiment of the actuator 130 may include a shape memory alloy material configured to alter or adjust geometry based on the control signal, such as, but not limited to, a temperature input to the actuator 130. For example, the actuator 130 may include a two-way shape memory alloy such as to expand and contract the length 124 of the second walled conduit 120 based on changes in the control signal. Various exemplary shape memory alloy materials may include, but are not limited to, nickel, titanium, zinc, copper, gold, or iron, or combinations thereof.

It should be appreciated that one or more other control signals may be utilized to adjust or modulate the actuator 130. It should further be appreciated that one or more other types of actuator may be utilized to adjust or modulate the length 124 of the second walled conduit 120.

Referring back to FIGS. 2-6, in various embodiments the second walled conduit 120 defines a parametric oscillator. For example, during operation of the engine 10 including the fluid manifold assembly 100, vibrations may occur due, at least in part, to the flow of fluid 105. When a sufficiently high amplitude of vibration is applied from the first fluid passage 115 through the second fluid passage 125, the second walled conduit 120 may be disposed or coupled to the first walled conduit 110 substantially perpendicular or approximately 90 degrees to a direction of vibration at the first frequency 104 defining a resonant frequency f at the first walled conduit 110, fractions or multiples of the frequency f (e.g., f/2, f, 2f, etc.) vibration may be enabled due to the non-linear interaction of the two vibrations. As such, fluid oscillations are communicated back into the first fluid passage 115 via the second fluid passage 125 to contain or otherwise mitigate acoustic resonance in the fluid manifold assembly 100 in a non-dissipative manner. However, it should be appreciated that the second walled conduit 120 may be coupled to the first walled conduit 110 at one or more other angles other than 90 degrees such as to provide the desired frequency vibration relative to the flow of fluid 105 through the first walled conduit 110.

In another embodiment, such as generally depicted in regard to FIG. 6, the second walled conduit 120 defines a helical arrangement around the first walled conduit 110. The helical arrangement of the second walled conduit 120 may enable expansion and contraction of the length 124 of the second walled conduit 120. For example, the helical arrangement of the second walled conduit 120 may permit an expanding or contracting spring structure to the second walled conduit 120 such as to enable cyclic alteration or modulation based on changes in the fluid parameter or engine operating conditions.

Figure 7:
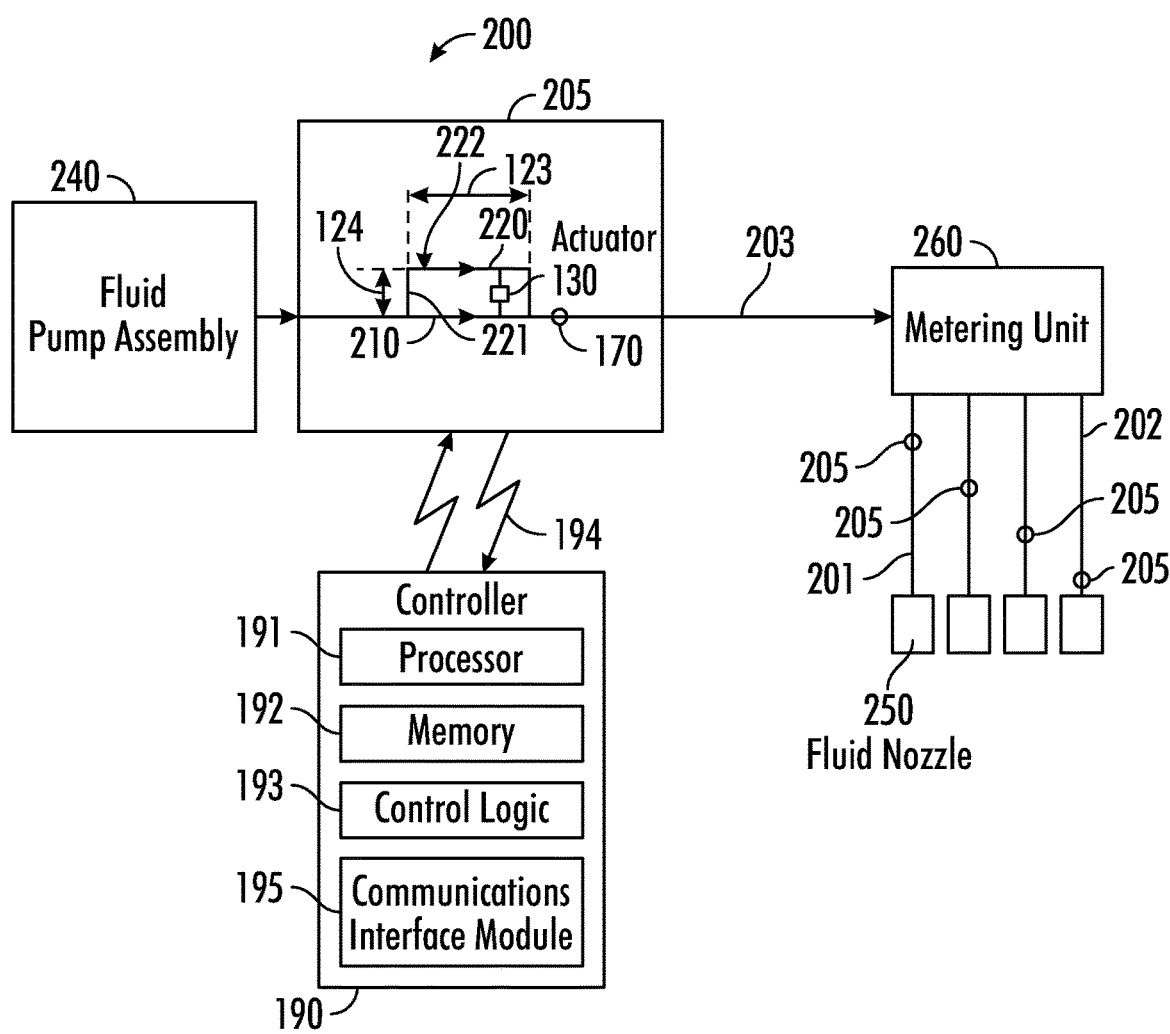
FIG. 7 is an exemplary fluid system including an embodiment of the fluid manifold assembly depicted in FIGS. 2-6.

Referring now to FIG. 7, an exemplary schematic embodiment of the fluid system 200 for the engine 10 is generally provided. The fluid system 200 includes various embodiments of the fluid manifold assembly 100 shown and described in regard to FIGS. 2-6. The fluid system 200 includes a fluid pump assembly 240 configured to provide a liquid or gaseous flow of fluid to the engine 10. The fluid system 200 further includes one or more fluid outlets 250 through which the flow of fluid is provided to the engine 10, such as a combustion chamber, a turbine or inter-turbine burner, an augmentor, a bearing assembly, an airflow or gas flow passage, etc.

Various embodiments of the fluid outlets 250 may define one or more flow or metering zones therethrough to provide fuel to the combustion chamber defining one or more flow or pressure characteristics corresponding to the flow or metering zones. For example, the fluid outlets 250 may define fuel nozzles defining a pilot fuel flow conduit and a main fuel flow conduit separately controllable from the pilot fuel flow conduit. As another example, the fluid outlets 250 may define a fuel nozzle defining a primary pilot fuel flow conduit and a second pilot fuel flow conduit to further tune, modulate, alter, or otherwise control combustion characteristics (e.g., combustion dynamics, emissions, power output, etc.). It should be appreciated that the fluid outlets 250 may generally define one or more flow conduits therethrough such as to tune, modulate, alter, or otherwise desirably control flow characteristics at the engine 10, such as, but not limited to, pressure oscillations, noise, vibrations, harmonics, etc.

The fluid system 200 further includes a fluid manifold assembly 205. The fluid manifold assembly 205 is configured such as shown and described in regard to the fluid manifold assembly 100 in regard to FIGS. 2-6. The fluid manifold assembly 205 is disposed in fluid communication between the fluid pump assembly 240 and the fluid outlet(s) 250 via a feeder conduit 203. The fluid manifold assembly 205 includes a main conduit 210 at which the flow of fluid enters defining a first frequency. The fluid manifold assembly 205 further includes a bypass conduit 220 coupled in fluid communication at two or more discrete locations to the main conduit 210. The flow of fluid through the bypass conduit 220 defines a second frequency approximately 180 degrees out of phase from the first frequency as the flow of fluid re-enters the main conduit 210. As such, the flow of fluid through the bypass conduit 220 contains, mitigates, or eliminates the acoustic resonance frequency of the fluid at the main conduit 210 as the fluid from the bypass conduit 220 re-enters the main conduit 210.

Various embodiments of the fluid manifold assembly 205 define the main conduit 210 such as shown and described in regard to various embodiments of the first walled conduit 110. The fluid manifold assembly 205 further defines the bypass conduit 220 such as shown and described in regard to various embodiments of the second walled conduit 120. Still further embodiments of the fluid manifold assembly 205 may include an actuator coupled to and modulating the length of the bypass conduit 220, such as embodiments of the actuator 130 shown and described in regard to FIGS. 2-6.

One embodiment of the fluid manifold assembly 205 may define the main conduit 210 as a portion of the feeder conduit 203, such as generally provided in regard to FIG. 7. Other embodiments, such as generally provided in regard to FIGS. 2 and 7, the main conduit 210 of the fluid manifold assembly 205 may define a portion of a flow conduit to the fluid outlets 205, such as a first flow conduit 201 or a second flow conduit 202 further described below.

The fluid system 200 may further include one or more sensors 170 disposed at the bypass conduit 220, the main conduit 210 or both, such as shown and described in regard to FIGS. 2-6. In various embodiments, the sensor 170 is configured to measure, calculate, or otherwise detect the fluid parameter of the fuel at the main conduit 210. In one embodiment, the sensor 170 is further configured to measure, calculate, or otherwise detect the fluid parameter of the fluid at the bypass conduit 220. The sensor 170 may transmit and receive control signals 194 to and from the controller 190. The controller 190 may be configured to send commands or execute operations to the actuator 130 such as further outlined below.

The controller 190 is configured to execute operations including adjusting the second frequency of the flow of fluid at the bypass conduit 220 to be 180 degrees out of phase from the first frequency of the flow of fluid at the main conduit 210, such as shown and described in regard to the first walled conduit 110 and the second walled conduit 120 in regard to FIGS. 1-7.

The operations may further include actuating the actuator 130 coupled to the bypass conduit 220 to adjust the length 124 of the bypass conduit 220 such as to modulate the second frequency of the fluid at the bypass conduit 220 to cancel out the first frequency at the main conduit 210 via defining the second frequency approximately 180 degrees out of phase from the first frequency. In one embodiment, actuating the actuator 130 may more specifically adjust the length 124 of the bypass conduit 220 via modulating the length 124 of the bypass conduit 220 at the first portion 221 of the bypass conduit 220, such as shown and described in regard to the second walled conduit 120 in regard to FIGS. 1-7.

The operations may still further include determining the length 124 of the bypass conduit 220 to produce the second frequency of the flow of fluid through the bypass conduit 220 approximately 180 degrees out of phase to the first frequency of the flow of fluid at the main conduit 210. In one embodiment, determining the length 124 of the bypass conduit 220 includes measuring, via the sensor 170, the first frequency of the flow of fluid at the main conduit 210; measuring, via the sensor 170, the second frequency of the flow of fluid at the bypass conduit 210; and comparing the first frequency and the second frequency. For example, comparing the first frequency and the second frequency may include referencing, extrapolating, interpolating, or otherwise utilizing a predetermined schedule, a transfer function, a graph, a chart or lookup table, or a function.

Referring still to FIG. 7, and further in conjunction with FIG. 2, in various embodiments, the fluid system 200 may further include a metering unit 260 disposed between the fluid nozzle 250 and the fluid pump assembly 240. The metering unit 260 divides the flow of fluid into two or more independently controllable flow conduits to the fluid nozzle 250, such as depicted schematically at a first flow conduit 201 and a second flow conduit 202. In still various embodiments, the fluid manifold assembly 205 may be disposed at one or more of the flow conduits 201, 202. For example, the first flow conduit 201 may define a pilot flow conduit such as described above. As another example, the second flow conduit 202 may define a main flow conduit such as described above. As still another example, the independently controllable flow conduits may include two or more conduits from the metering device 260, or further branched off from the first flow conduit 201 or the second flow conduit 202.

In one embodiment, the system 200 may include a plurality of first flow conduits 201 and/or second flow conduits 202 that may be selectively operated to provide desired frequency mitigation over a plurality of different frequency ranges based at least on a plurality of operating conditions. For example, the metering unit 260 may selectively operate each flow conduit 201, 202 in an on/off or otherwise binary technique to permit the flow of fluid through one or more conduits 201, 202 to provide the fluid to the fluid nozzle 250 at the desired frequency. Each metering unit 260 may be coupled to each flow conduit 201, 202 in which each fluid manifold assembly 205 is configured to mitigate one or more ranges of frequencies different from one another based on a plurality of operating conditions.

As another example, a plurality of the second walled conduit 120 may diverge from the first walled conduit 110 and re-attach to the first walled conduit 110 upstream or downstream of the divergent point. The plurality of the second walled conduit 120 may each be configured based at least on different frequencies of the flow of fluid to be attenuated. The metering unit 260 may operate each second walled conduit 120 such as to permit or disable flows from one or more second walled conduits 120 to and from the first walled conduit 110 based on the desired frequency to be attenuated.

Embodiments of the fluid manifold assembly 100 generally shown and described herein may be implemented as a liquid and/or gaseous fuel system of the combustion section 26 providing fuel to mix with the compressed air 82 to produce combustion gases 86. Other embodiments may be implemented as a liquid and/or gaseous fuel system of an inter-turbine burner (e.g., at the turbine section 31) or an afterburning exhaust or augmentor system (e.g., at the exhaust nozzle 32), such as to mix and combust liquid and/or gaseous fuel with the combustion gases 86 shown in FIG. 1. Still other embodiments of the fluid manifold assembly 100 may be implemented at combustion chambers of internal combustion engines generally. The embodiments of the fluid manifold assembly 100 generally provided may mitigate fuel coupled dynamics, thereby mitigating durability deterioration at the engine 10 and combustion section 26. The embodiments generally provided herein mitigates acoustic resonance between the fluid manifold assembly 100 and combustion dynamics at the combustion section 26 (i.e., vibrations, acoustics, noise, etc. produced during combustion of the fuel and air mixture at the combustion section 26). The embodiments of the fluid manifold assembly 100 may generally provide passive non-dissipative mitigation of acoustic resonance at different operating conditions or combustion dynamics modes (e.g., fuel/air mixtures across various pressures and/or temperatures of air 82 entering the combustion section 26).

Still other embodiments of the fluid manifold assembly 100 may be implemented at a lubricant or hydraulic system of the engine 10, or at an air or gas supply system of the engine 10 (e.g., bleed air, cooling air, damper air, etc.). Still yet various embodiments of the fluid manifold assembly 100 may be implemented at air or gas supply systems of an industrial system, such as, but not limited to, fluid delivery systems, pumps, heating/cooling systems, etc., such as to mitigate or eliminate vibrations, noise, harmonics, knocking, etc. resulting in fluid coupled dynamics.

All or part of the fluid manifold assembly 100 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct one or more portions of the fluid manifold assembly 100 separately or integrally, such as, but not limited to, the first walled conduit 110, the second walled conduit 120, and the actuator 130. Furthermore, the fluid manifold assembly 100 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid manifold assembly, the fluid manifold assembly comprising:
   a first walled conduit defining a first fluid passage therewithin, the first fluid passage having a distance, wherein a flow of fluid defining a first frequency is permitted through the first fluid passage;
   a second walled conduit comprising:
      an upstream first portion and a downstream first portion each coupled to the first walled conduit, each of the upstream first portion and the downstream first portion having a length; and
      a second portion coupled between the upstream first portion and the downstream first portion, wherein the second walled conduit defines a second fluid passage through the upstream first portion, the downstream first portion, and the second portion, the second fluid passage in fluid communication with the first fluid passage, wherein a portion of the flow of fluid is permitted through the second fluid passage and the portion of the flow of fluid is provided from the second fluid passage back into the first fluid passage, and wherein the portion of the flow of fluid defines a second frequency, wherein the distance of the first fluid passage is defined between the upstream first portion and the downstream first portion and wherein the distance is equal to a distance of the second fluid passage between the upstream first portion and the downstream first portion;
   a first sensor disposed at the first fluid passage, the first sensor configured to measure a first fluid parameter of the flow of fluid in the first fluid passage; and
   a second sensor disposed at the second fluid passage, the second sensor configured to measure a second fluid parameter of the portion of the flow of fluid in the second fluid passage,
   wherein the length of the upstream first portion and the downstream first portion is configured to be adjusted based on a comparison of the first fluid parameter of the flow of fluid in the first fluid passage and the second fluid parameter of the portion of the flow of fluid in the second fluid passage to adjust the second frequency to be approximately 180 degrees out of phase from the first frequency when the portion of the flow of fluid is provided from the second fluid passage back into the first fluid passage,
   wherein the second frequency generates destructive interference of the first frequency such as to cancel out the first frequency of the flow of fluid downstream of a re-entry of the portion of the flow of fluid into the first fluid passage, and
   wherein the second frequency cancels out the first frequency along the distance.

2. The fluid manifold assembly of claim 1, wherein the upstream first portion receives the portion of the flow of fluid into the second fluid passage and the downstream first portion provides the portion of the flow of fluid from the second fluid passage to the first fluid passage.

3. The fluid manifold assembly of claim 1, further comprising:
   an actuator coupled to the second walled conduit, wherein the actuator adjusts the length of the second walled conduit to correspond to the second frequency approximately 180 degrees out of phase from the first frequency.

4. The fluid manifold assembly of claim 3, wherein the actuator adjusts the length of the second walled conduit at the upstream first portion and the downstream first portion.

5. The fluid manifold assembly of claim 3, wherein the actuator is configured in fluid communication with the first fluid passage to receive a control signal defining a fluid parameter of a fluid through the first walled conduit.

6. The fluid manifold assembly of claim 1, wherein the second walled conduit defines a helical arrangement around the first walled conduit.

7. The fluid manifold assembly of claim 1, wherein the second walled conduit defines a parametric oscillator.

8. The fluid manifold assembly of claim 1, wherein the fluid is a liquid or gaseous fuel in fluid communication with a fuel nozzle.

9. The fluid manifold assembly of claim 1, wherein the fluid is an oil or oil-based solution in fluid communication with a lubricant system.

10. The fluid manifold assembly of claim 1, wherein the first fluid parameter includes the first frequency, the second fluid parameter includes the second frequency, and wherein the comparison includes a difference between the first frequency and the second frequency.

* * * * *